United States Patent [19]
Duncombe et al.

[11] 3,922,192
[45] Nov. 25, 1975

[54] NUCLEAR REACTOR INSTRUMENTATION
[75] Inventors: Edward Duncombe, Hale; Gerald McGonigal, Liverpool, both of England
[73] Assignee: United Kingdom Atomic Energy Authority, London, England
[22] Filed: Oct. 9, 1973
[21] Appl. No.: 404,241

[30] Foreign Application Priority Data
Nov. 1, 1972 United Kingdom............... 50441/72

[52] U.S. Cl.............. 176/19 R; 73/194 EM; 73/198; 73/341
[51] Int. Cl............................................. G21c 17/02
[58] Field of Search ...... 73/194 EM, 198, 340, 341, 73/349; 176/19 R, 19 J, 80

[56] References Cited
UNITED STATES PATENTS
3,724,268  4/1973  Kuwabara...................... 73/194 EM
3,764,467  10/1973  Erp .................................. 176/19 R

*Primary Examiner*—Stephen C. Bentley
*Attorney, Agent, or Firm*—Larson, Taylor and Hinds

[57] ABSTRACT

A liquid metal cooled nuclear reactor has an equal number of fuel sub-assemblies and sensing instruments. Each instrument senses temperature and rate of coolant flow of a sample of coolant derived from a group of three sub-assemblies so that an abnormal value for one sub-assembly will be indicated on three instruments thereby providing for redundancy of up to two of the three instruments. The abnormal value may be a precurser to unstable boiling of coolant.

4 Claims, 5 Drawing Figures

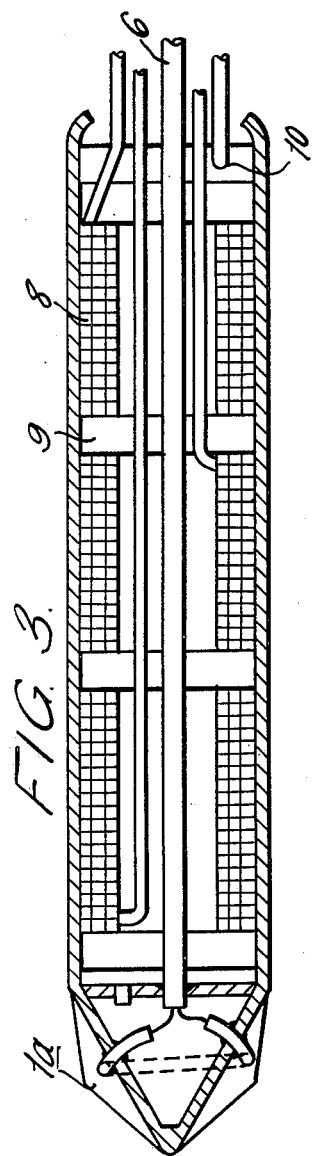
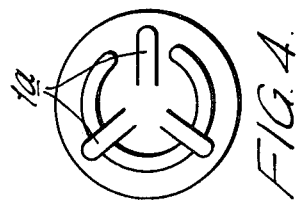
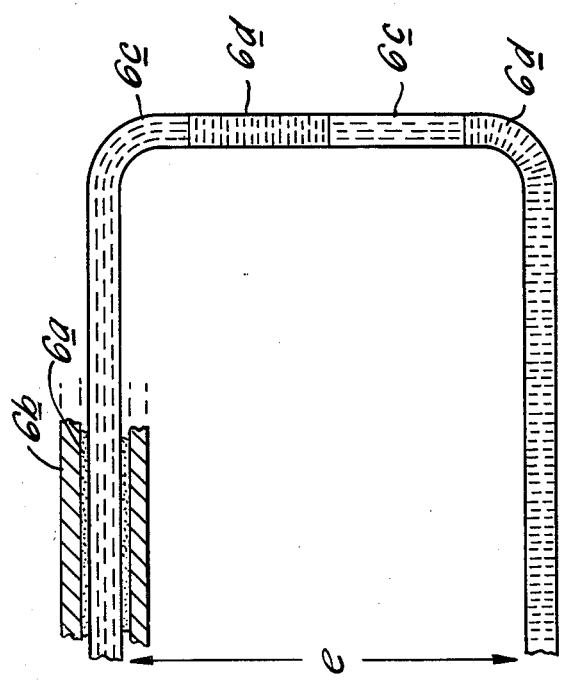

NUCLEAR REACTOR INSTRUMENTATION

BACKGROUND OF THE INVENTION

This invention relates to nuclear reactor instrumentation.

In a nuclear reactor core comprising a multiplicity of parallel, closely spaced fuel pins, the pins are usually arranged in discrete groups to facilitate handling and replacement. Each group can comprise a cluster of pins enclosed within a peripheral wrapper and such an assembly is hereinafter referred to as a fuel element sub-assembly. In order to ensure the safe operation of such an installation, for example, a liquid metal cooled fast reactor installation, it is necessary to maintain constant surveillance of some parameters of coolant flow through the sub-assemblies. Such parameters may be, for example, temperature and rate of flow of coolant because an increase in temperature accompanied by a fall in the rate of flow may indicate the formation of a restriction to coolant flow through the sub-assembly. However, in a nuclear reactor having a large quantity say 500, of instrumented sub-assemblies, an impossible number of sensors is required if each sub-assembly is to be monitored for a plurality of parameters and if a conventional redundancy technique whereby each instrument is installed threefold is to be employed. For example, in a reactor core having 500 instrumented sub-assemblies in each of which coolant temperature and rate of coolant flow is to be sensed or measured, a total of 3000 sensors would be required.

SUMMARY OF THE INVENTION

According to a wide aspect of the present invention, in a nuclear reactor having a plurality of instrumented fuel element sub-assemblies through which fluid coolant can flow there is an equal quantity of instruments for sensing at least one parameter of coolant flow, each instrument being arranged to monitor a sample flow of coolant derived from at least two adjoining sub-assemblies. According to a narrow aspect of the invention each instrument senses two parameters of a sample flow of coolant derived from a group of three adjoining sub-assemblies. In such an arrangement each of the two parameters is sensed in relation to each sub-assembly by three instruments.

The invention also resides in an instrument for sensing the temperature, and rate of liquid metal flow of a sample of coolant derived from adjoining sub-assemblies of a liquid metal cooled nuclear reactor. A currently preferred instrument according to the invention has three thermo-couple hot junctions connected in series, each hot junction being disposed for exposure to a sample flow from a single fuel element sub-assembly, and electromagnetic windings about an inductive core arranged to sense variation in flow of liquid metal by flux distortion. The instrument may also include a thermocouple disposed to sense the mean temperature of the sample flow of coolant derived from a plurality of sources whereby the temperature of coolant flow through a sub-assembly can be deduced from the three temperature readings associated with that sub-assembly.

DESCRIPTION OF THE DRAWINGS

The invention will be more clearly understood from the following description of nuclear reactor instrumentation given by way of example with reference to the accompanying diagrammatic drawings wherein:

FIG. 3 is a flow and temperature sensing unit,

FIG. 4 is an end view of the unit shown in FIG. 3, and

FIG. 5 is a detail of the sensing unit drawn to a larger scale.

DESCRIPTION OF THE PREFERRED EMBODIMENTS

Figure 1:
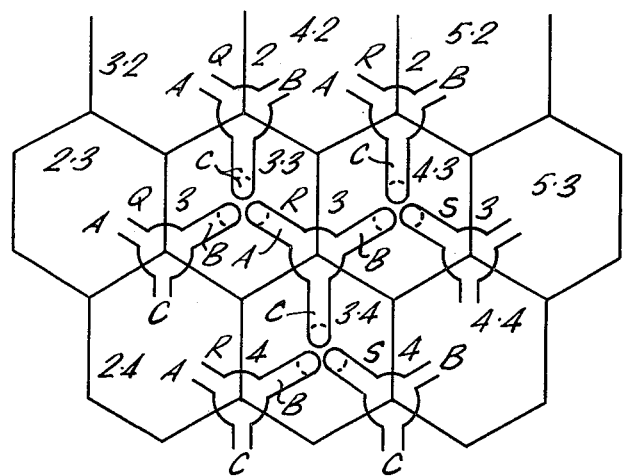
FIG. 1 is a fragmentary plan view of a nuclear reactor core.
Figure 2:
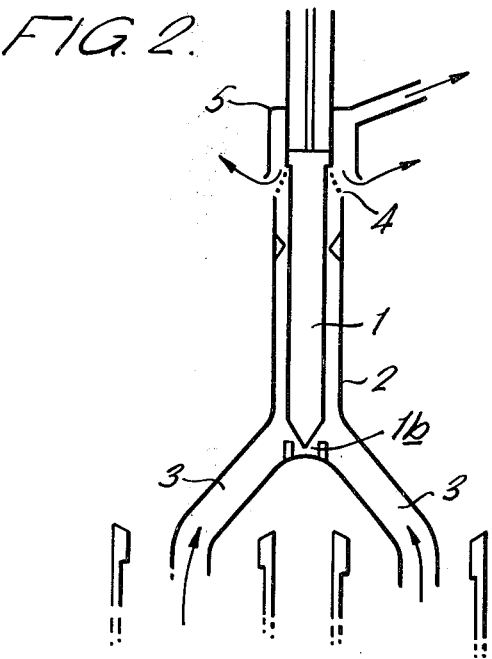
FIG. 2 is a fragmentary side view.

FIG. 1 illustrates a fragment of a fast nuclear reactor core which is cooled by liquid sodium. The core comprises a plurality of fuel element sub-assemblies of hexagonal cross-section arranged side by side. The sub-assemblies comprise wrappers or shrouds containing clusters of fuel pins and the coolant flows upwardly over the fuel pins. To ensure the safety of the reactor a constant watch is maintained on the coolant flow so that any variables in the parameters (being pre-cursors of pending fault conditions) are detected sufficiently early to enable corrective action to be taken. The reactor core illustrated has a total of 500 fuel element sub-assemblies which are required to be instrumented. Referring now to FIG. 2, a total of 500 flow and temperature sensing units 1 are provided, each unit being housed in a sleeve 2 having inlet ducts 3 for receiving coolant flow from the central regions of three adjoining sub-assembly outlets. Each sensing unit is capable of sensing variations in the parameters of flow and temperature of a sample of coolant flow derived from the three adjoining sub-assemblies.

In FIG. 1 the sub-assemblies are identified in rows, for example, 3.2, 4.2, 5.2, which are sub-assemblies 3, 4, and 5 in the horizontally shown row 2. The sensing stations are identified by characters Q, R and S in horizontally shown rows, for example Q2, R3, and the inlet ducts of the sleeves 2 are designated A, B and C. The sensing unit 1 in station Q2 receives flow from each of sub-assemblies 3.2, 4.2, and 3.3 by way of inlet ducts Q2A, Q2B and Q2C respectively. From another aspect, the total sample flow from sub-assembly 3.3, for example, is shared between sensing units in stations Q2, R3 and Q3. A change of output temperature, say, from sub-assembly 3.3 is thereby sensed by the instruments at stations Q2, R3, and Q3. It is still sensed if the instrument units in one or two out of three sensing stations fail. As shown in FIG. 2 the sensing unit 1 is suspended within the sleeve 2 and the proportional sample of coolant is forced through the annulus bounded by the sensing unit 1 and the sleeve 2 to exhaust through an orifice 4 into a dome 5. The dome 5 has an outlet for conducting a sub-sample to fission product sensing means whilst the remainder of the sample derived from three sub-assemblies is discharged from the base of the dome 5.

The sensing unit shown in FIGS. 3 and 4 comprises a flowmeter and a complete thermoelectric transient detector. A thermoelectric cable 6 (shown diagrammatically in FIG. 5) has a conductor with ceramic insulation 6a and stainless steel sheathing 6b and the conductor comprises, in series, chromel and alumel sections 6c and 6d presenting three thermocouple hot junctions. The hot junctions are disposed at the nose of the unit in such a manner that they are each exposed to coolant flow through separate inlet ducts 3. The resultant emf is the aggregate of corresponding temperatures Ta − Tb + Tc and a transient in any one stream appears, unattenuated, at the terminals of the sensing unit. The nose of the sensing unit has three ribs 1a for protecting the thermocouple hot junctions against damage and for engagement with a socket 1b in the sleeve 2 to locate the hot junctions in the appropriate coolant streams. For measuring the mean velocity of the sodium flow through the annulus in the conventional manner the unit has electromagnetic windings 8 on a ferromagnetic core 9; the resultant flux distortion signal is proportional to the rate of flow through the annulus. At the rear of the sensing unit one or more thermocouple hot junctions are mounted at 10 to provide an additional protective feature. The thermocouple measures the mean temperature of the coolant sample passing along the annulus $$\frac{(Ta + Tb + Tc)}{(3)}$$

which reading (provided that the mean sample is made from three equal component samples) can be utilized in conjunction with mean temperature readings derived from adjoining sensing units for extraction of a common value, say, Ta. The value Ta is the steady-state value of a sub-assembly outlet temperature and is useful for process purposes and as a safety measurement to allow any slow blockage of the sub-assembly to be reliably detected.

The exhaust coolant flow from each sleeve 2 contains a mean value of the fission products from three sub-assemblies and the representative sub-sample is passed to the counting system. The arrangement gives redundancy of fission product sampling points without loss of bulk detection sensitivity although it does, however, reduce the location sensitivity by a factor of 3.

We claim:

1. A liquid metal cooled nuclear reactor comprising a plurality of instrumented fuel element sub-assemblies through which coolant can flow upwardly and wherein there is an equal plurality of instruments for sensing the temperature and the rate of liquid metal flow of a sample of coolant derived from a group of at least three adjoining sub-assemblies, each group having a sleeve which defines a coolant flow duct and houses a sensing instrument, the sleeve having at least three inlet ducts arranged for receiving coolant flow from the central regions of each of the sub-assemblies of the group and a common outlet.

2. A nuclear reactor according to claim 1 wherein coolant flow from the common outlet is directed into a dome member, the dome member having an upper outlet for directing a sub-sample of coolant flow to fission product sensing means.

3. An instrument for sensing the temperature and rate of liquid metal flow of a sample of coolant derived from adjoining sub-assemblies of a nuclear reactor according to claim 1, the instrument having three thermocouple hot junctions connected in series, each hot junction being disposed for exposure to a sample flow from a single fuel element sub-assembly, and electro-magnetic windings about an inductive core arranged to sense variation in flow of liquid metal by flux distortion.

4. An instrument according to claim 3, having a thermocouple disposed to sense the mean temperature of the sample flow of coolant derived from the adjoining sub-assemblies.

* * * * *